Patented June 24, 1930

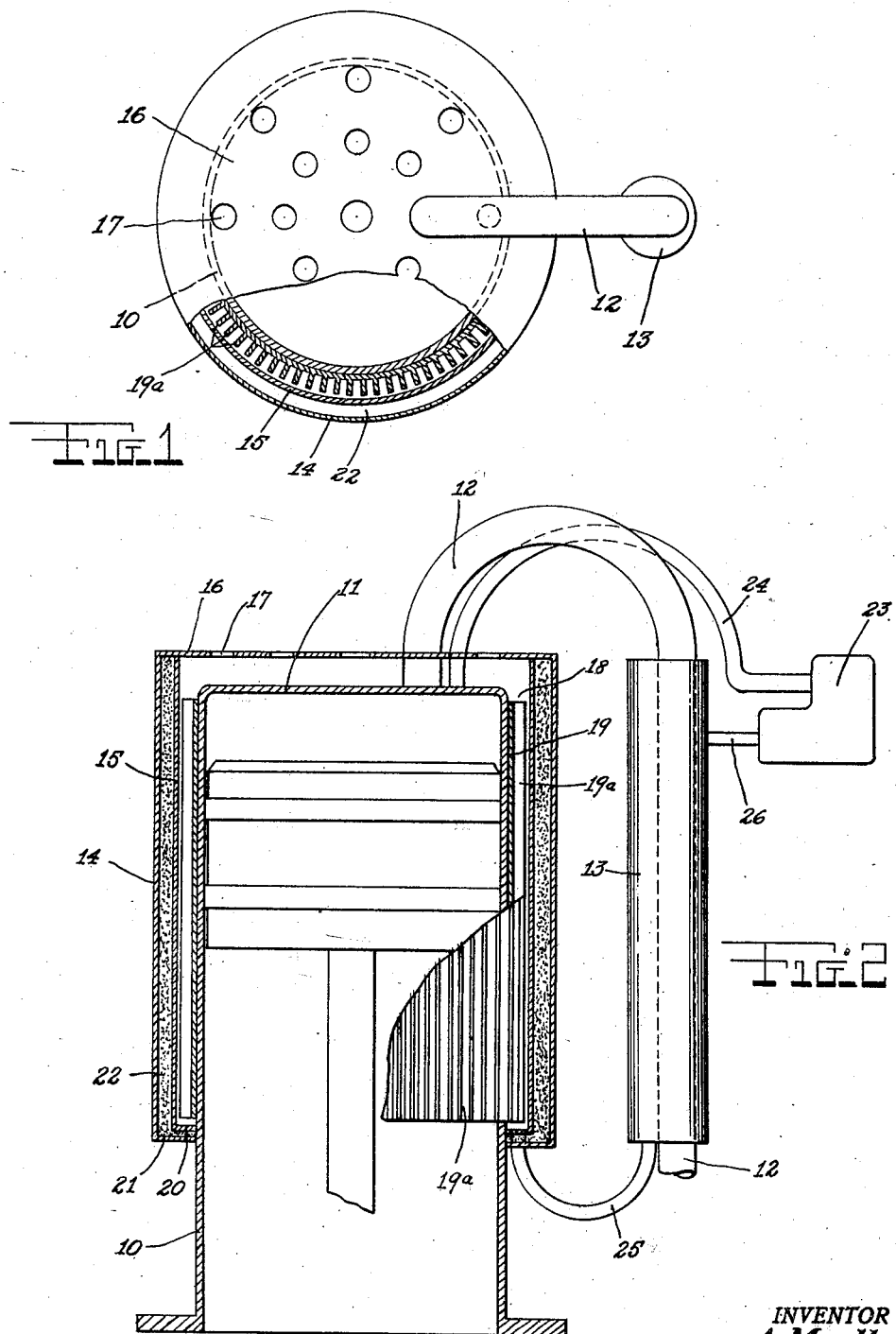

1,766,928

UNITED STATES PATENT OFFICE

ALFONS MUELLER, OF NEW YORK, N. Y.

MOTOR PREHEATER AND COOLER

Application filed March 5, 1927. Serial No. 172,977.

The main object of this invention is to provide a drum which encircles a cylinder of an internal combustion engine open at its upper end which serves the purpose of forming a conduit thru which air circulates for cooling the cylinder.

Another object of this invention is to provide a means for cooling a cylinder of an internal combustion engine and at the same time furnishing the carbureter of the engine with heated air so that the gasoline or fuel is more readily vaporized.

Still another object is to provide a device which forms an enclosure around a cylinder of an internal combustion engine and forms a passageway for a stream of air for cooling the cylinder walls, the air which passes from the device at a higher temperature being again utilized by the carbureter to aid in vaporizing the fuel.

The above and other objects will become apparent in the description below in which characters of reference refer to like-named parts in the drawing.

Referring briefly to the drawing, Figure 1 is a top plan view of the cylinder cooler and fuel preheater showing a portion thereof in section to illustrate the construction.

Figure 2 is a longitudinal sectional elevational view of the device showing the construction of the device in complete detail.

Referring in detail to the drawing the numeral 10 indicates one of the cylinders of a combustion engine. The cylinder is provided with a roof 11 which is tapped by a pipe 12 extending from the cylinder to the exhaust muffler (not shown) of the engine and constitutes the exhaust pipe. At a point between the cylinder and the muffler a container 13 is mounted on the exhaust pipe and entirely encircles the latter.

A drum 14 is mounted over the cylinder wall 10 and is of larger annular dimension than the cylinder so that an inner annular wall 15 may be formed, the wall 15 and the wall of the drum being formed concentrically one within the other. A roof 16 covers the upper ends of members 14 and 15 and is provided with a plurality of perforations 17 thru which atmospheric air enters the space 18 between the inner wall of the drum and the cylinder wall 10. The latter is enveloped by a band 19 which has a plurality of radiating ribs 19$^a$ extending therefrom. The lower end of the inner wall 15 is closed by a floor 20 which is raised above a similar floor 21, which latter closes the lower end of the wall 14 of the drum. The space 22 between the inner and outer walls of the drum is filled with some suitable insulating material capable of resisting heat.

A carbureter diagrammatically shown is indicated by the numeral 23 and has a tube 24 extending therefrom which passes thru the roof of the drum and furnishes the vaporized fuel to the cylinder. A tube 25 connects the container with the chamber 18 between the cylinder wall and the inner wall of the drum. An additional tube 26 forms the intake of the carbureter and connects the latter with the container 13.

The device is used to preheat the fuel passing thru the carbureter and at the same time cool the wall 10 of the cylinder 10 of the engine. As the carbureter inhales thru the tube 25, container 13 and tube 26, air is likewise inhaled thru the perforations 17 in the roof of the 16 of the drum. The air is from the atmosphere and passes thru the channel 18 and between the ribs 19$^a$ and as it passes thru this portion of the device it aids in cooling off the cylinder wall 10. In passing thru this chamber 18 the air is heated as it passes downwardly and makes its exit thru the tube 25. By capturing this air it may again be utilized as an aid in more rapidly vaporizing the fuel. This is accomplished by joining the outlet end of the tube 25 to the container 13 which encircles a portion of the exhaust pipe 12. The latter is entirely closed and has the tube 25 serving as an inlet, the tube 26 at the opposite end of the container being connected to the carbureter directly. With the construction shown and described, a device is provided which simultaneously accomplishes the cooling of the walls of an engine cylinder and furnishes warmed air to the carbureter in which condition it is used.

It is to be noted that certain changes in form and construction may be made without departing from the spirit and scope of the invention.

I claim:

A device for double heating of carburetor air comprising a carburetor, a cylinder of a combustion engine, an exhaust pipe extending from said cylinder, a container enclosing said exhaust pipe, a tube leading from the carburetor to said container, a casing enclosing said cylinder having air inlet perforations therein, and a tube leading from said casing to said carburetor, said tubes leading from said container and said casing forming a passageway for the air circulating into said carbureter, the confined air being heated by radiation from the cylinder.

In testimony whereof I affix my signature.

ALFONS MUELLER.